(No Model.)
A. F. & H. C. MOHRENWEISER.
AUTOMATIC BRAKE.
No. 550,080. Patented Nov. 19, 1895.
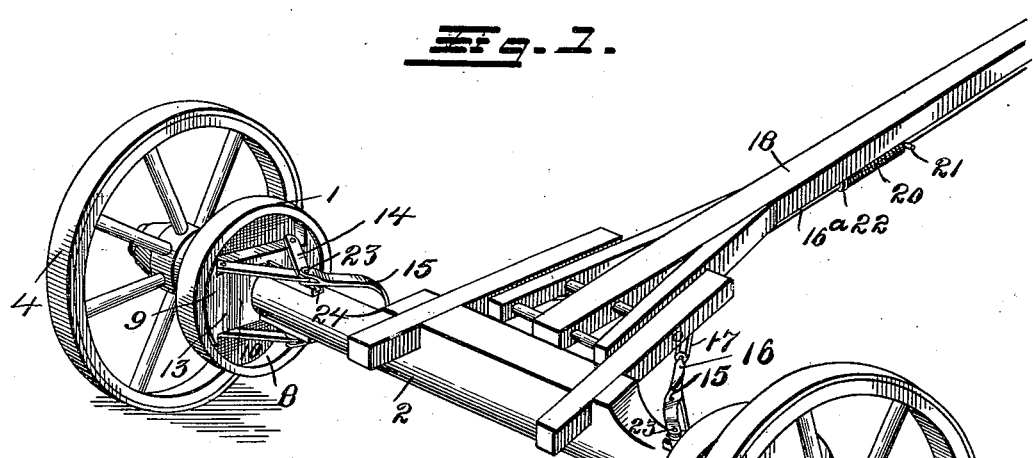
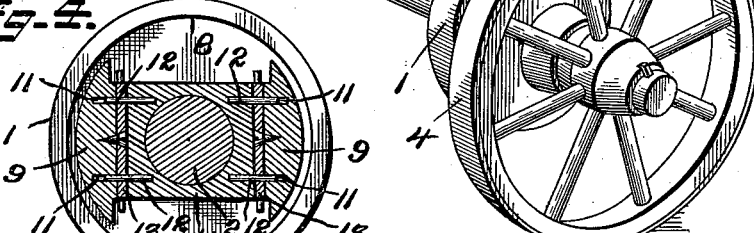
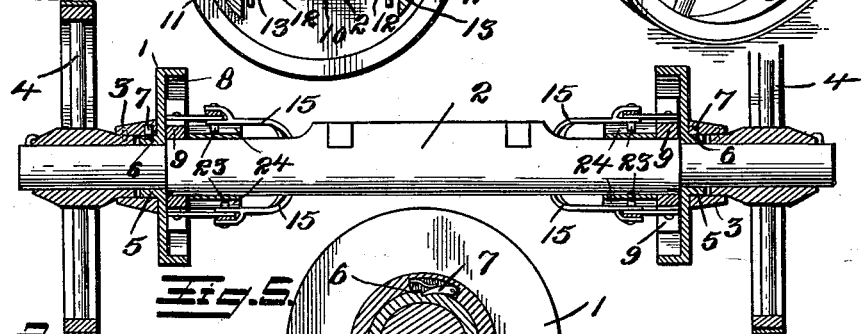
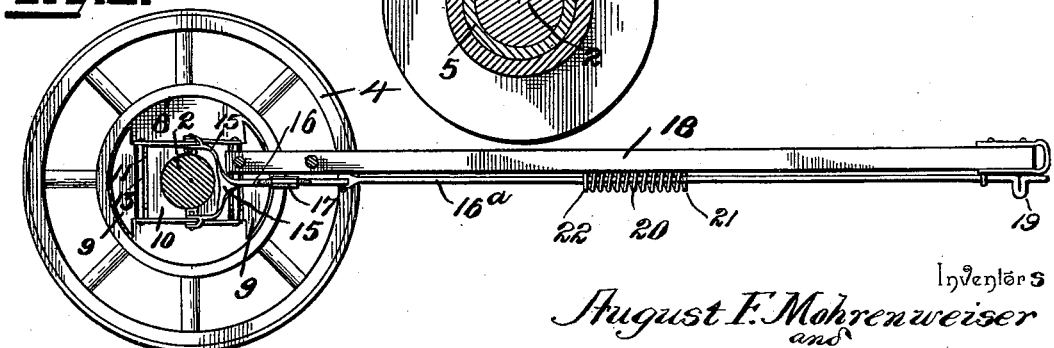
Witnesses
W. J. Koerth.
J. H. Riley.
Inventors
August F. Mohrenweiser
and
Henry C. Mohrenweiser,
By their Attorneys.
C. A. Snow & Co.

UNITED STATES PATENT OFFICE.

AUGUST F. MOHRENWEISER AND HENRY C. MOHRENWEISER, OF HENDERSON, MINNESOTA.

AUTOMATIC BRAKE.

SPECIFICATION forming part of Letters Patent No. 550,080, dated November 19, 1895.

Application filed July 13, 1895. Serial No. 555,882. (No model.)

*To all whom it may concern:*

Be it known that we, AUGUST F. MOHRENWEISER and HENRY C. MOHRENWEISER, citizens of the United States, residing at Henderson, in the county of Sibley and State of Minnesota, have invented a new and useful Automatic Brake, of which the following is a specification.

The invention relates to improvements in automatic brakes for vehicles.

The object of the present invention is to improve the construction of automatic vehicle-brakes and to provide a simple, inexpensive, and efficient one, adapted to be readily applied to the front axles of vehicles of the ordinary construction and capable of ready adjustment to take up the wear on the brake-shoes.

The invention consists in the construction and novel combination and arrangement of parts hereinafter fully described, illustrated in the accompanying drawings, and pointed out in the claims hereto appended.

In the drawings, Figure 1 is a perspective view of a portion of a running-gear provided with an automatic brake constructed in accordance with this invention. Fig. 2 is a longitudinal sectional view of the same. Fig. 3 is a transverse sectional view. Fig. 4 is a detail sectional view illustrating the manner of mounting the brake-shoes. Fig. 5 is a similar view illustrating the construction of the clutch.

Like numerals of reference indicate corresponding parts in all the figures of the drawings.

1 designates a brake or friction wheel located at each end of the front axle 2 of a running-gear at the inner side of the front wheel and provided with an annular collar or flange 3, rigidly bolted to the inner end of the hub of the wheel 4, whereby the brake or friction wheel 2 is caused to rotate with the front wheel. The flange or collar 3 is constructed separate from the brake or friction wheel 1 and is connected with it by a ratchet which permits the front wheel to be backed without rotating the friction or brake wheel 1, and the latter has formed integral with it an annular flange 5, which is provided at its outer periphery with a shoulder 6, adapted to be engaged by a spring-actuated pawl 7, pivoted at the inner periphery of the collar 3 in a recess thereof.

The brake or friction wheel 1 is provided with an inwardly-projecting rim 8, the inner periphery of which is engaged when the brake is applied by the means hereinafter described by a pair of segmental brake-shoes 9, located within the rim at the web of the wheel 1, the projecting portion of the flange or rim 8 being the same width as the thickness of the brake-shoes 9. The brake-shoes 9 are located at the ends of a block or support 10, which is rigidly mounted on the front axle 2, and they are provided with sockets 11, arranged in pairs and receiving projecting pins 12, rigidly mounted on the ends of the supporting-block 10 and forming guides for the brake-shoes. Secured to the inner straight faces of the brake-shoes are bars 13, terminating in projecting pivots located at opposite sides of the supporting-block and fitting in perforations of the outer ends of toggle-levers 14.

The toggle-levers 14 are located above and below the front axle and are centrally connected to forked portions 15 of connecting-bars 16, which converge forwardly from opposite sides of the front axle and are coupled to the rear end of an operating-rod $16^a$. The forked portions of the connecting-bars straddle the ends of the axle 2, and these bars are composed of two sections connected by a turnbuckle 17, which is adapted to vary the length of the connecting-bar to adjust the brake-shoe to take up the wear and to enable them to clamp properly the brake or friction wheel 1.

The operating-rod is mounted in suitable guides on the lower face of the tongue 18, and its rear end is loosely connected with the front ends of the bars 16 to conform to the movement of the pole or tongue. The front end of the operating-rod is bent to form a shoulder or stop 19, to be engaged by the neck-yoke, whereby the brake is operated, and in descending a hill or other incline when the vehicle moves forward on the draft-animals, the neck-yoke operating as a holdback, and being connected to the operating-rod forces the latter rearward and applies the brake. The application of the brake is directly in proportion to the weight of the vehicle and its load, and the brake is entirely automatic in its operation, as will be readily understood.

The brake-shoes are thrown off of the wheels 1 when there is no pressure on the operating-rod by means of a spiral spring 20, disposed on the operating-rod and interposed between a stop 21 of the same and a guide 22, which forms a bearing for the rear end of the spring.

The central portions of the toggle-levers are guided by having their pivots 23 arranged in suitable dovetail ways or guides 24, mounted at the top and bottom of the axle at each side thereof and consisting of a bottom portion and opposite side flanges. The pivot is beveled or recessed at opposite sides to form a head to slide in the guide or ways.

It will be seen that the brake is simple and inexpensive in construction, that it is automatic in operation, and that the degree to which the brake is applied is in direct proportion to the weight of a vehicle and its load. It will also be apparent that the brake-shoes are readily thrown off the brake-wheels as soon as the draft-animals exert a forward pressure or commence to pull and that the brake is applicable to all kinds of vehicles employing draft-animals.

Changes in the form, proportion, and the minor details of construction may be resorted to without departing from the principle or sacrificing any of the advantages of this invention.

What we claim is—

1. The combination with a running gear, of a brake wheel mounted on one of the axles and connected with a vehicle wheel, a supporting block fixed to the axle, brake shoes mounted on the supporting block in front and in rear of the same and arranged to engage the brake wheel, the horizontally disposed toggle levers located above and below the axle and pivotally connected to the ends of the brake shoes, and means for operating the toggle levers, substantially as described.

2. The combination with a running gear, of brake wheels mounted on the front axle and connected with the front wheels, blocks fixed to the front axle and arranged adjacent to the brake wheels, brake-shoes mounted on the blocks in front and in rear of the same and arranged to engage the brake wheel, the horizontal toggle levers arranged above and below the axle and pivotally connected to the ends of the brake-shoes, and an operating rod mounted on the tongue or pole and connected with the toggle levers, substantially as and for the purpose described.

3. The combination of a running gear, brake wheels mounted on the front axle and connected with the front wheels, blocks fixed to the front axle, brake shoes mounted on the blocks and located in front and in rear of the same and arranged to engage the brake wheels, the horizontal toggle levers pivotally connected to the ends of the brake-shoes, and arranged above and below the front axle, an operating rod mounted on the tongue and the converging bars connected with the rear end of the operating rod and having forked portions connected with the toggle levers, substantially as described.

4. The combination of a running gear, a brake wheel mounted on the axle adjacent to one of the wheels of the vehicle, ratchet mechanism connecting the brake wheel with the adjacent vehicle wheel, brake-shoes connected with the axle and arranged to engage the brake wheel, toggle levers connecting the brake shoes and arranged to force the same into engagement with the brake wheel, and means for operating the toggle levers, substantially as described.

5. The combination of a running gear, guides mounted on the front axle, brake wheels connected with the front wheels of the running gear, brake shoes arranged to engage the brake wheel, toggle levers connected at their outer ends to the brake shoes and centrally connected with said guides, and means for operating the toggle levers, substantially as described.

6. The combination of a running gear, a brake wheel mounted on one of the axles and provided at its outer side with a flange having a shoulder, a collar mounted on the adjacent wheel and provided with a pawl for engaging said shoulder, brake-shoes connected with the axle and arranged to engage the brake wheel, and means for operating the brake shoe, substantially as described.

In testimony that we claim the foregoing as our own we have hereto affixed our signatures in the presence of two witnesses.

AUGUST F. MOHRENWEISER.
HENRY C. MOHRENWEISER.

Witnesses:
MARTIN SHAUGHNESSY,
PETER McGRANN.